(No Model.)
J. F. STRANGE & A. W. TABER.
MACHINE FOR MAKING TWIST DRILLS.
No. 275,791.   Patented Apr. 10, 1883.
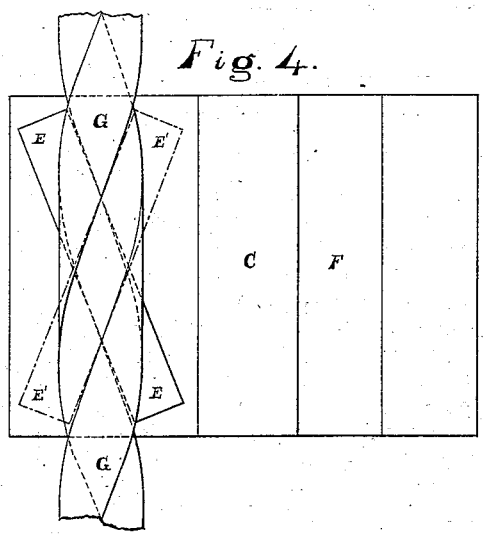
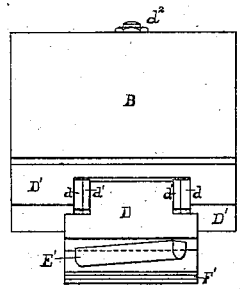
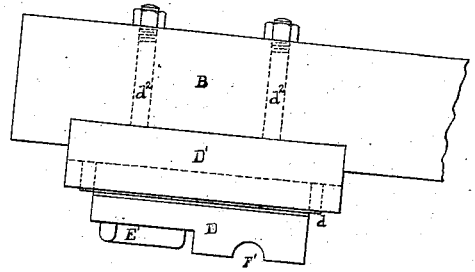
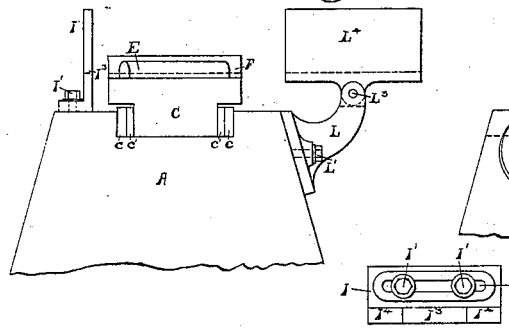
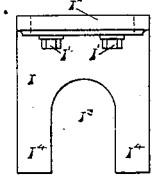
WITNESSES:  
J. C. Brock  
Hattie L. Brock
INVENTORS  
Albert West Taber  
John Franklin Strange

UNITED STATES PATENT OFFICE.

JOHN F. STRANGE, OF NEW BEDFORD, AND ALBERT W. TABER, OF TAUNTON, MASSACHUSETTS.

MACHINE FOR MAKING TWIST-DRILLS.

SPECIFICATION forming part of Letters Patent No. 275,791, dated April 10, 1883.

Application filed November 8, 1882. (No model.)

*To all whom it may concern:*

Be it known that we, JOHN FRANKLIN STRANGE and ALBERT WEST TABER, citizens of the United States, residing respectively at New Bedford, in the county of Bristol and State of Massachusetts, and at Taunton, in the county of Bristol and State of Massachusetts, have invented certain new and useful Improvements in the Manufacture of Twist-Drills, of which the following is a specification.

Our invention relates to the manufacture of twist-drills. Twist-drills are now most generally made in one of two ways—by milling them from a round rod of metal or by twisting a bar of the metal which has been rolled or fashioned into the shape and size desired. By milling them you cut away the skin metal, which is generally found to be tougher than the heart metal, and you also cut away and cut into the grain which was given to the metal in its manufacture, and as the metal is ordinarily thinner in the center than on the outside in cross-section the weakest metal is left in the weakest place. Again, the method by milling is a long and tedious one as compared with our improvement. By twisting a drill from a bar of metal you get rid of the defects in the drill caused by milling them, but you also put the drill under a continual tensional and torsional strain, to which strains the drills are very liable to give way upon much augmentation of the trouble. The object of our invention is to provide a device which, while doing away with the defects of the milling and the unnecessary strains of the twisting systems, increases the speed of manufacture at least ten times, and of course makes a corresponding decrease in the price at which they can be manufactured and put on the market. Another advantage of our system is that as there is no metal cut away or milled out there is no waste, and consequently one-third of the stock of a milled drill is saved; and since metal, if properly treated and worked, is refined by a certain amount of hammering, the drill constructed in accordance with our method is a more refined, and consequently stronger, drill than one which is milled. As there are no strains put into the drill in its manufacture, the particles of the metal are all in equilibrium, and therefore better able to withstand a strain brought upon it than one in which the particles of the metal are strained half-way to their elastic limit before beginning to do any work.

Our invention is applicable to any form of trip, steam, or other form of power hammer, or to a swaging or other machine used for forging.

It consists of two dies, one of which is fastened securely to the foot or anvil block of the machine, and the other to the hammer-head of the machine. These dies consist of two rabbeted surfaces, which cannot come together closer than the diameter of the drill to be forged, and upon which surfaces are fastened, forged, or cast beads which are placed at such an angle with each other that one-half of the angle of obliquity between them shall be equal to the angle of the twist to be given to the drill, the drill, in forging, being placed so as to bisect this angle. While forging, in order to keep the drill at the same angle with each of the beads, guides for holding the drill are provided.

Our invention will be made clearer by referring to the accompanying sheet of drawings, in which similar letters of reference indicate corresponding parts.

Figure 1 is a side elevation of an ordinary trip-hammer to which our invention has been applied; Fig. 2, an end elevation, looking at it from the front of the hammer or from the left of Fig. 1. Fig. 3 is a top view and side elevation of one form of guides for holding the drills while being forged, as is shown in a reduced size attached to anvil-block of the hammer and to the left of Fig. 2. Fig. 4 is a full-size top view of the lower die for an ordinary right-hand twist-drill, together with the drill G in position for forging. The bead of the upper die is shown in "dot-dash" lines E'.

A is the anvil-block,

B is the hammer-head.

C and D are dies fastened in the usual way by keys or gibs $c$ and $c'$, $c$ and $c'$, and by $d$ and $d'$, $d$ and $d'$, respectively, to the anvil-block A and the die-holder D', respectively.

D' is fastened to the hammer-head B by bolts $d^2$ $d^2$ in the usual way.

The dies C and D are alike. Each consists of two flat surfaces, the one being rabbeted below the other. On the rabbeted surfaces are fastened, forged, or cast beads E' E', inclined to each other at the angles shown in Figs. 1, 2, and 4 for a right-hand drill of twenty degrees twist. Of course these beads may be of any other shape than semicircular—such as semi-elliptical, or square, &c. They may also be placed at any angle to suit the twist of the drill to be forged.

It will be noticed in Fig. 2 that the bead E does not come up to the level of the flat surface of the die. The same is true of bead E', and the sum of the distances that the top of bead E is below the flat surface of the die C and the bottom of bead E' is above the flat surface of the die D will be the distance apart of the two beads when the two dies are together, and also the thickness of the metal at the center of the drill. It will thus be seen that the cross-section of the drill may be varied by varying the form and distance apart and obliquity of beads E and E' when the two dies C and D are together, and that the angle of twist may be varied by changing the obliquity of the beads E and E' with reference to each other, as is shown in Fig. 4. As the groove is forged in the drill by the beads E E' of the dies C and D, respectively, striking or hammering the the drill, the rod swells in size and increases in length. In order to keep it at the required diametral size, the dies also have in the surfaces, which come together at each stroke or blow of the hammer-head B, an ordinary circular swage, F F', for drawing the rod down to size. After the first blow is given, upon pulling or pushing the drill-rod in the direction of its axis it will tend to rotate and will follow the groove formed by the first stroke, and will so form a perfectly regular groove if the drill is moved in the line of its axis. In order that the drill shall not move in the line of its axis, and that the groove may be regular, guides are provided to hold the drill-rod from any side motion. These guides are shown in the drawings, Figs. 1, 2, and 3, of two styles.

In Figs. 2 and 3, I is a stationary upright bracket, having slot $I^2$ to adjust the guide by means of the bolts I' I' in a direction sidewise to the drill G. In the vertical part a half-round hole and slot, $I^3$, for holding the drill, is made, leaving the fingers or guides $I^4$ $I^4$.

L, Figs. 1 and 2, is a bracket, fastened to anvil-block A by means of bolts L' L'. Slots $L^2$ $L^2$ are provided for the side adjustment of the guide similar to $I^2$ in bracket I. In the upper end of L is a pin, $L^3$, about which swivels a drill holder or guide, $L^4$, having a bearing, $L^5$. The drill-holder $L^4$, instead of swiveling about $L^3$, may be stationary, and fastened to or form part of bracket L, if desired.

We do not confine ourselves to the positions for the guides I and $L^4$ shown in the drawings, as where they are attached is immaterial, since they may be fastened to any part of the anvil-block, or to an auxiliary and outside bracket. As the fingers or guides $L^4$ are long in the direction of the length of the drill, when the bracket L and guide $L^4$ are used no other guide is needed; but when guides I are used one of them should go on each side of the die to support the drill. Either of these two forms of guides may be employed, as the user may see fit, the one being adapted for some sizes and styles of drills better than the other.

What we claim, and desire to secure by Letters Patent, is—

1. In a die for forging a spiral groove or twist in a drill, the inclined bead E and swage F, substantially as described.

2. A pair of dies, C and D, with beads cast, formed, or forged on or fastened obliquely across a plain or rabbeted surface in a trip, steam, or other hammer, or in a swaging or other machine used for forging.

3. In a trip, steam, or other hammer, or in a swaging or other machine used for forging, the combination of said dies C and D with anvil-block A and hammer-head B.

4. In a trip, steam, or other hammer, or in a swaging or other machine used for forging, the combination of said dies with the fixed or interchangeable guides I and L.

JOHN FRANKLIN STRANGE.
ALBERT WEST TABER.

Witnesses:
LOUISA A. BROCK,
HATTIE L. BROCK.